US011969734B2

(12) United States Patent
Thiel et al.

(10) Patent No.: US 11,969,734 B2
(45) Date of Patent: Apr. 30, 2024

(54) THREE-DIMENSIONAL GRINDER, METHOD FOR IMPLEMENTING SAME AND USES THEREOF

(71) Applicant: DEASYL SA, Plan-les-Ouates (CH)

(72) Inventors: Julien Thiel, Arbusigny (FR); François Lacoste, Neuilly sur Seine (FR); Valentin Lair, Annemasse (FR); Samy Halloumi, La Roche sur Foron (FR); Irène Malpartida, Mija Costa (ES); Benoît Moevus, Ayse (FR)

(73) Assignee: DEASYL SA, Plan-les-Ouates (CH)

( * ) Notice: Subject to any disclaimer, the term of this patent is extended or adjusted under 35 U.S.C. 154(b) by 507 days.

(21) Appl. No.: 17/058,947

(22) PCT Filed: May 27, 2019

(86) PCT No.: PCT/EP2019/063656
§ 371 (c)(1),
(2) Date: Nov. 25, 2020

(87) PCT Pub. No.: WO2019/228983
PCT Pub. Date: Dec. 5, 2019

(65) Prior Publication Data

US 2021/0213459 A1 Jul. 15, 2021

(30) Foreign Application Priority Data

May 29, 2018 (FR) ........................................ 1854592

(51) Int. Cl.
*B02C 17/00* (2006.01)
*B02C 17/16* (2006.01)
*B02C 17/18* (2006.01)

(52) U.S. Cl.
CPC ........ *B02C 17/163* (2013.01); *B02C 17/1815* (2013.01)

(58) Field of Classification Search
CPC ........................... B02C 17/163; B02C 17/1855
See application file for complete search history.

(56) References Cited

U.S. PATENT DOCUMENTS 3,696,816 A * 10/1972 Buchmann .......... B02C 17/1805 131/370
5,464,163 A * 11/1995 Zoz ........................ B02C 17/163 241/179

(Continued)

FOREIGN PATENT DOCUMENTS

CN 102389764 A 3/2012
CN 107743475 A 2/2018

(Continued)

OTHER PUBLICATIONS

International Search Report for PCT/EP2019/063656 dated Sep. 2, 2019, 7 pages.

(Continued)

*Primary Examiner* — Faye Francis
(74) *Attorney, Agent, or Firm* — NIXON & VANDERHYE

(57) ABSTRACT

A three-dimensional grinder includes: a stationary grinding chamber having a generally cylindrical wall along a longitudinal axis XX and delimiting an inner space, the chamber receiving and mixing a starting compound, and generally at least two, in a liquid medium, forming an initial mixture, the stationary grinding chamber being partially filled with a grinding body, which stationary grinding chamber includes, at a first end, an inlet introducing the starting compound and the liquid medium and, at a second end, an outlet discharging an end product formed in the stationary grinding chamber; a stirrer in the stationary grinding chamber, including a rod extending along the longitudinal axis XX, the stirrer being capable of pivoting to move the grinding body/initial mixture mass, the stationary grinding chamber including, in (Continued)

the inner space, a heating device to heat an area of the stationary grinding chamber. The heating device is an introduction heating device.

17 Claims, 3 Drawing Sheets

(56) References Cited

U.S. PATENT DOCUMENTS

| | | | | |
|---|---|---|---|---|
| 5,475,123 | A | 12/1995 | Bos | |
| 5,597,126 | A * | 1/1997 | Frommherz | B02C 17/163 241/180 |
| 2005/0224612 | A1 * | 10/2005 | Heinzelmann | B02C 17/163 241/172 |
| 2013/0233953 | A1 * | 9/2013 | Enderle | B02C 17/16 241/38 |
| 2013/0344204 | A1 | 12/2013 | Goodson | |
| 2017/0055585 | A1 | 3/2017 | Fursa | |

FOREIGN PATENT DOCUMENTS

| | | | | | |
|---|---|---|---|---|---|
| CN | 109261326 | A | * | 1/2019 | B02C 17/002 |
| CN | 111111853 | A | * | 5/2020 | B02C 17/1865 |
| CN | 112169926 | A | * | 1/2021 | B02C 17/10 |
| CN | 112221615 | A | * | 1/2021 | |
| CN | 114522772 | A | * | 5/2022 | |
| DE | 44 34 940 | | | 4/1995 | |
| DE | 100 64 828 | | | 6/2002 | |
| JP | S57501783 | A | | 10/1982 | |
| JP | H06503372 | A | | 4/1994 | |
| JP | 2001-180933 | | | 7/2001 | |
| JP | 2001-180933 | A | | 7/2001 | |
| JP | 2001-181512 | A | | 7/2001 | |
| JP | 2004-098416 | A | | 4/2004 | |
| JP | 2009-633 | | | 1/2009 | |
| JP | 2011-115729 | A | | 6/2011 | |
| JP | 2011-161375 | A | | 8/2011 | |
| JP | 2016524777 | A | | 8/2016 | |
| JP | 2018-513099 | A | | 5/2018 | |
| KR | 19980038136 | U | * | 9/1998 | B02C 17/163 |
| KR | 10-1822480 | | | 3/2018 | |
| WO | 8201867 | A1 | | 6/1982 | |
| WO | 2016/156749 | A1 | | 10/2016 | |
| WO | WO-2018203022 | A1 | * | 11/2018 | B02C 17/161 |

OTHER PUBLICATIONS

Written Opinion of the ISA for PCT/EP2019/063656 dated Sep. 2, 2019, 6 pages.

Office Action issued in Chinese Patent Application No. 201980049156.X dated Dec. 28, 2021.

Office Action issued in Japanese Patent Application No. 2020-567091 dated Mar. 28, 2023.

Office Action issued in Korean Patent Application No. 10-2020-7034356 dated Mar. 29, 2023.

Notice of Allowance, issued in Japanese Patent Application No. 2020-567091 dated Mar. 5, 2024.

* cited by examiner

THREE-DIMENSIONAL GRINDER, METHOD FOR IMPLEMENTING SAME AND USES THEREOF

This application is the U.S. national phase of International Application No. PCT/EP2019/063656 filed May 27, 2019 which designated the U.S. and claims priority to FR Patent Application No. 1854592 filed May 29, 2018, the entire contents of each of which are hereby incorporated by reference.

TECHNICAL FIELD TO WHICH THE INVENTION RELATES

The present invention relates to the field of three-dimensional mills for the micro-milling of at least one raw material. In particular, the present application relates to a three-dimensional mill containing a heating device, and in particular an induction heating device.

The invention also relates to an operating method for the above-mentioned mill, and to the uses thereof for, in particular, making organic or mineral chemistry synthesis reactions.

TECHNOLOGICAL BACKGROUND

It is known from the state of the art the application U.S. Pat. No. 5,597,126 relating to a three-dimensional microbead mill for the milling, in a liquid medium, of a product that is generally in powder form.

This mill comprises in particular a cylindrical or conical milling chamber, extending along a longitudinal axis, which is intended to receive the microbeads and the liquid medium. The chamber includes, at one end, a product inlet and, at its other end, opposite to the first one, a product outlet. The mill also comprises a mixer that is coaxial to the axis of the chamber and that is capable of pivoting so as to set in motion the liquid medium and the microbeads. The mixer further comprises several mixing members distributed over its length in order to favour the milling.

This type of mill is used in particular in the pharmaceutical field in order to reduce the diameter of a product, for example from the order of micrometre to nanometre.

Although satisfying to reduce the particle size of a product, there exists a need in the state of the art for a new three-dimensional microbead mill having improved properties.

The present invention has hence for object to provide a new three-dimensional mill capable in particular to improve the dispersion or the putting in contact of at least one starting compound, preferably at least two, which is industrially exploitable and simple to implement.

OBJECT OF THE INVENTION

To that end, the present invention relates to a three-dimensional mill comprising at least:

- a stationary milling chamber having a wall of generally cylindrical shape extending along a longitudinal axis XX and delimiting an inner space, said milling chamber being capable of receiving and mixing at least one starting compound, generally at least two, in a liquid medium, so as to form an initial mixture, said chamber being intended to be partially filled with at least one milling body, preferably microbeads,
- wherein said stationary milling chamber comprises, at a first end, at least one inlet for the introduction of at least said at least one starting compound and the liquid medium and, at a second end, an outlet capable of evacuating a final product formed in said stationary milling chamber;
- a stirrer arranged in said stationary milling chamber, including an elongated rod along the longitudinal axis XX, said stirrer being capable of pivoting so as to set in motion the milling body/initial mixture unit,
- characterized in that the stationary milling chamber integrates in said inner space at least one heating device, that is implanted to heat at least one zone of said stationary milling chamber.

In particular, the heating device is an induction heating device.

Due to these features, the mill according to the invention makes it possible to perform efficient mechanosynthesis reactions, in particular continuous ones, thanks to the presence of the heating device, such as an induction heating device. Indeed, such a device makes it possible, for example, to activate organic or mineral chemistry synthesis reactions requiring a certain reaction temperature, allows the use of starting compounds liable to be in liquid form as a function of their melting temperature, or the use of starting compounds whose viscosity is not suitable at ambient temperature. The mill according to the invention is hence just intended for the starting compound in powder form, which is the general use of a three-dimensional microbead mill.

Hence, the mill according to the invention has for advantage to form a reactor allowing the efficient synthesis of chemical compounds because capable of operating in temperature, and to further increase the yields of these chemical syntheses, while reducing the usual reaction times. As illustrated in the experimental part hereinafter, the reaction times generally pass from 3-13 hours to a time lower than 1 hour, typically lower than 1 minute (for example, transesterification reaction of dimethyl carbonate according to the desired conversion rate).

Moreover, the heating device, such as an induction heating device, makes it possible to heat the initial mixture that is in the form of a liquid flow, even if the latter has a high flow rate, and that, without heat dissipation out of the mill. Indeed, the heating device located inside the stationary chamber makes it possible to provide enough thermal energy to the continuous flow, i.e. to the continuous flow rate of the starting compound(s) in the liquid medium passing through the stationary chamber. A simple heating of the periphery of the stationary chamber would lead to a whole loss because a part of this energy would have been dissipated out of the bowl, which is not the case of the heating device according to the invention.

Finally, the present invention has for advantage to allow the positioning (at the inlet and/or in the middle of the stationary chamber, etc.) and the adjustment (desired temperature) of said at least one heating device, such as an induction heating device, as a function of the desired reaction.

Other non-limitative and advantageous features of the three-dimensional mill according to the invention, taken individually or according to all the technically possible combinations, are the following:

- said induction heating device is carried by at least one part of said stirrer, for setting said induction heating device in rotation;
- said induction heating device comprises: at least one inducer capable of generating a magnetic field, and at least one susceptor, electrically conductive, which is coupled to said inducer and is capable of being heated by the latter;

the stationary milling chamber integrates a magnetic screen arranged between said inducer and said stirrer rod, so as to direct the heating towards the initial mixture;

said magnetic screen comprises a first tubular portion that is sleeved onto at least a portion of length of said stirrer rod and a second disk-shaped portion, connected to the first portion, which is arranged perpendicular to said rod;

said at least one inducer is a coil or a solenoid having turns that surround a portion of said stirrer rod, advantageously an upstream section, said rod portion being, where appropriate, protected by said magnetic screen;

said at least one susceptor corresponds to a first mixing member, arranged perpendicular to the stirrer, advantageously located at the first end of the stationary milling chamber;

the first mixing member includes a base made integral with the stirrer rod, said inducer being implanted at said base;

the stationary milling chamber comprises, arranged perpendicular to the stirrer, one or several other mixing members, different from the first mixing member;

said at least one induction heating device is located near the first end of the stationary milling chamber;

said at least one induction heating device is connected to an alternating current generator arranged outside said milling chamber, through at least one current supply means, which is preferably coaxial to the stirrer rod;

the stationary milling chamber comprises a pressure-control means, such as a valve;

the mill comprises a cooling means, such as a heat exchanger, arranged outside said stationary milling chamber, on the side of the second end;

the mill comprises at least one temperature-control means and/or at least one pressure-control means inside the stationary milling chamber.

The invention also proposes an operating method of the three-dimensional mill as defined hereinabove, characterized in that it comprises the successive following steps:

(i) starting the heating device, preferably an induction heating device, and setting the stirrer in rotation;

(ii) introducing said at least one starting compound, generally at least two, in the liquid medium, so as to form an initial mixture, through the inlet of the stationary milling chamber;

(iii) milling said initial mixture that is heated by the heating means to a temperature of at least 60° C., preferably from 60 to 800° C., in particular from 60 to 400° C., during a residence time lower than or equal to 30 minutes, preferably lower than or equal to 15 minutes, in particular lower than or equal to 1 minute, and notably from 5 to 25 seconds;

(iv) collecting, at the outlet of the stationary milling chamber, the final product formed in said chamber.

Preferably, the method comprises the following additional step:

(v) cooling the final product, so that the latter has a temperature lower than or equal to 60° C., preferably lower than or equal to 50° C., and typically lower than or equal to 30° C.

Finally, the present invention relates to the use of the three-dimensional mill as described hereinabove to perform organic and mineral chemistry synthesis reactions or to mill at least one starting compound.

In the following of the description, unless otherwise specified, the indication of an interval of values "from X to Y" or "between X and Y", in the present invention, is to be understood as including the values X and Y.

By "starting compound", it is meant any compound able to be in liquid, gas, solid (powder, etc.) form, the starting compound being generally a reagent making it possible to make a chemical synthesis reaction with another starting compound and/or the liquid medium according to the desired reaction.

By liquid medium, it is meant any liquid medium making it possible to improve the mixing of the starting compounds with the milling bodies, such as the microbeads; according to the desired reaction, this starting medium may also correspond to one of the reagents in excess.

By "final product", it is meant the product obtained at the outlet of the mill including in particular also the intermediate reaction products.

DESCRIPTION OF THE FIGURES

The invention will better understood, and other objects, details, features and advantages thereof will appear more clearly upon reading of the following description of non-limitative exemplary embodiments of the invention, with reference to the appended figures, in which.

DETAILED DESCRIPTION OF AN EXEMPLARY EMBODIMENT

Figure 1:
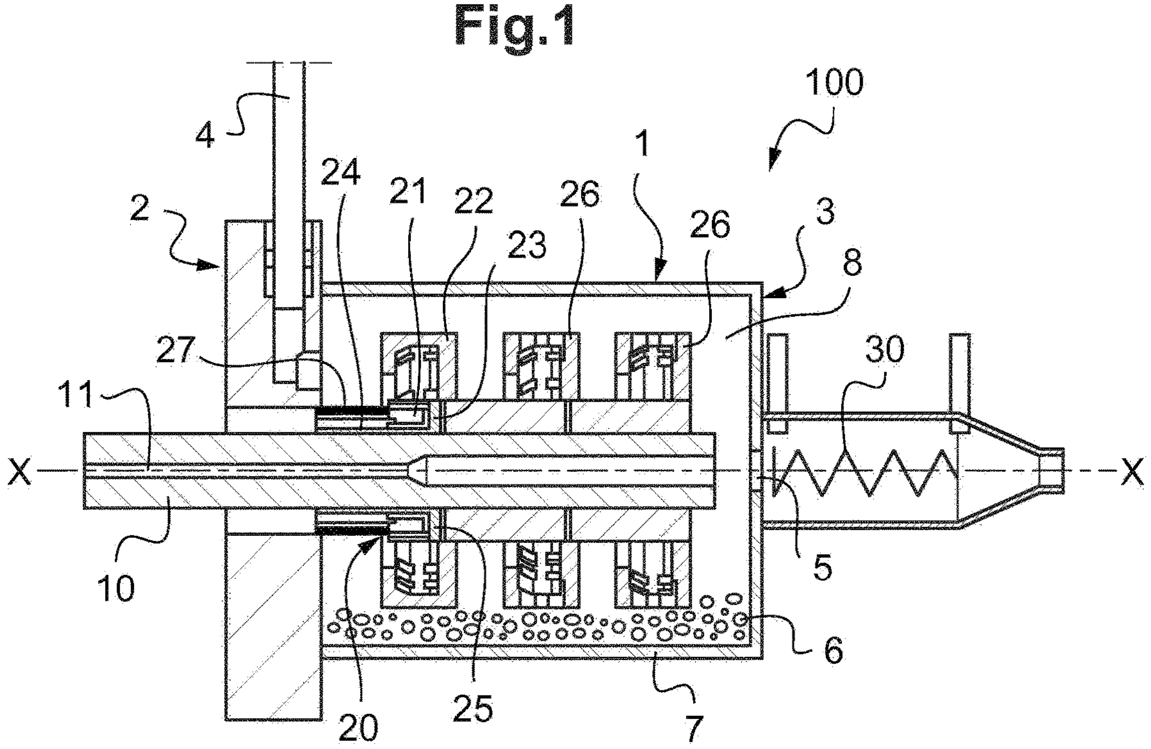
FIG. 1 shows a sectional view, along a sectional plane passing through the longitudinal axis XX, of a three-dimensional mill according to a first embodiment of the invention comprising in particular an induction heating device.

The Applicant has focused to the development of a new improved three-dimensional mill, adapted for the implementation at industrial scale.

In particular, the Applicant has developed a mill for making, most often in a single step, chemical synthesis reactions showing a good to excellent conversion rate, in very short reaction times (generally in less than one hour and typically less than 10 minutes) at temperatures higher than or equal to 60° C., and that, with a relatively low energy consumption.

Such a mill according to the invention will be described hereinafter with reference to FIGS. 1 to 3.

The three-dimensional mill 100 comprises at least one stationary milling chamber 1 having a generally cylindrical wall 7 that envelops an inside 8.

The wall 7 extends along a longitudinal axis XX, advantageously horizontal.

This stationary milling chamber 1 is configured to receive and mix at least one starting compound, generally at least two, in a liquid medium, so as to form an initial mixture.

Indeed, when the mill 100 is intended to reduce the size of the particles or of a powder, the chamber 100 can receive a single starting compound. When the mill 100 is intended to make chemical syntheses, the chamber can receive at least tow distinct starting compounds. Generally, at least two starting compounds will be introduced into the stationary milling chamber 1.

Moreover, this stationary milling chamber 1 is also intended to be partially filled with at least milling bodies 6, such as microbeads 6.

The stationary chamber 1 comprises, at a first (upstream) end 2, an inlet 4 that opens into the stationary milling chamber 1 and that serves to introduce the starting compound(s) and the liquid medium.

This inlet 4 can also serve to introduce the microbeads 6 before the operation of the mill 100. As will be seen hereinafter, the size and the nature of the microbeads 6 depend on the desired synthesis reaction and can be adjusted in consequence.

The milling chamber 100 comprises, at a second (downstream) end 3, an outlet 5 that leads to the outside and that is configured to evacuate a final product formed in the stationary milling chamber 1.

The outlet 5 generally includes a separation means (not shown), such as a sieve or a grid, adapted to evacuate only the final product and to hence retain the microbeads 6 when the mill 100 is in operation.

In particular, the inlet 4 is generally connected to at least one pump, for example a peristaltic pump (not shown). This pump makes it possible to supply the starting compound(s) or also the initial mixture, if previously prepared, inside the stationary milling chamber 1 via the inlet 4.

The starting compound(s), or the previously prepared initial mixture, can for example be contained in at least one container, such as a bowl. The pump moreover makes it possible, during the operation of the three-dimensional mill 100, to supply the starting mixture at a certain flow rate that is adjustable, hereinafter called "passage flow rate". This passage flow rate further forms in the stationary chamber 1 a flow that allows the starting mixture to be carried along from the inlet 4 to the outlet 5.

The three-dimensional mill 100 also comprises a stirrer 10 that includes an elongated rod 11 along the longitudinal axis XX and that mainly extends from the vicinity of the first end 2 to beyond the second end 3 of the stationary chamber 1.

This elongated rod 11 advantageously extends coaxially to the above-mentioned longitudinal axis XX.

This stirrer 10 is in particular adapted to pivot so as to set in motion, in addition to the above-mentioned passage starting, the milling body 6 and initial mixture unit.

In particular, the stirrer 10 is configured to turn over itself, about the longitudinal axis XX, via an elongated rod 11 (or rotating shaft), to impart a swirling movement to the initial mixture inside the stationary chamber 1 and hence perform an intense stirring between this initial mixture and the microbeads 6 present in the chamber 1 along the inner surface of the wall 7 of this chamber 1.

In particular, the stirrer 10, via its elongated rod 11, can have a rotational speed higher than or equal to 100 rotations per minute, advantageously higher than or equal to 1000 rotations per minute (rpm), preferably higher than or equal to 2000 rotations per minute, and typically higher than or equal to 2500 rotations per minute.

Within the meaning of the invention, "a rotational speed higher than or equal to 100 rotations per minute" comprises the following values: 100; 150; 200; 250; 300; 350; 400; 450; 500; 550; 600; 650; 700; 750; 800; 850; 900; 950; 1000, etc., or all the intervals comprised between these values, "a rotational speed higher than or equal to 1000 rotations per minute" comprises the following values: 1000; 1100; 1200; 1300; 1400; 1500; 1600; 1700; 1800; 1900; 2000; 2100; 2200; 2300; 2400; 2500; 2600; 2700; 2800; 2900; 3000; 3100; 3200; 3300; 3400; 3500; 3600; 3700; 3800; 3900; 4000; 4500; 5000; 5500; 6000; etc., or all the intervals comprised between these values.

Generally, the stirrer 10 has a rotational speed going from 1000 rpm to 5000 rpm, in particular from 1500 rpm to 4500 rpm, preferably from 2000 rpm to 4000 rpm and, typically, from 2800 to 3200 rpm.

Figure 3:
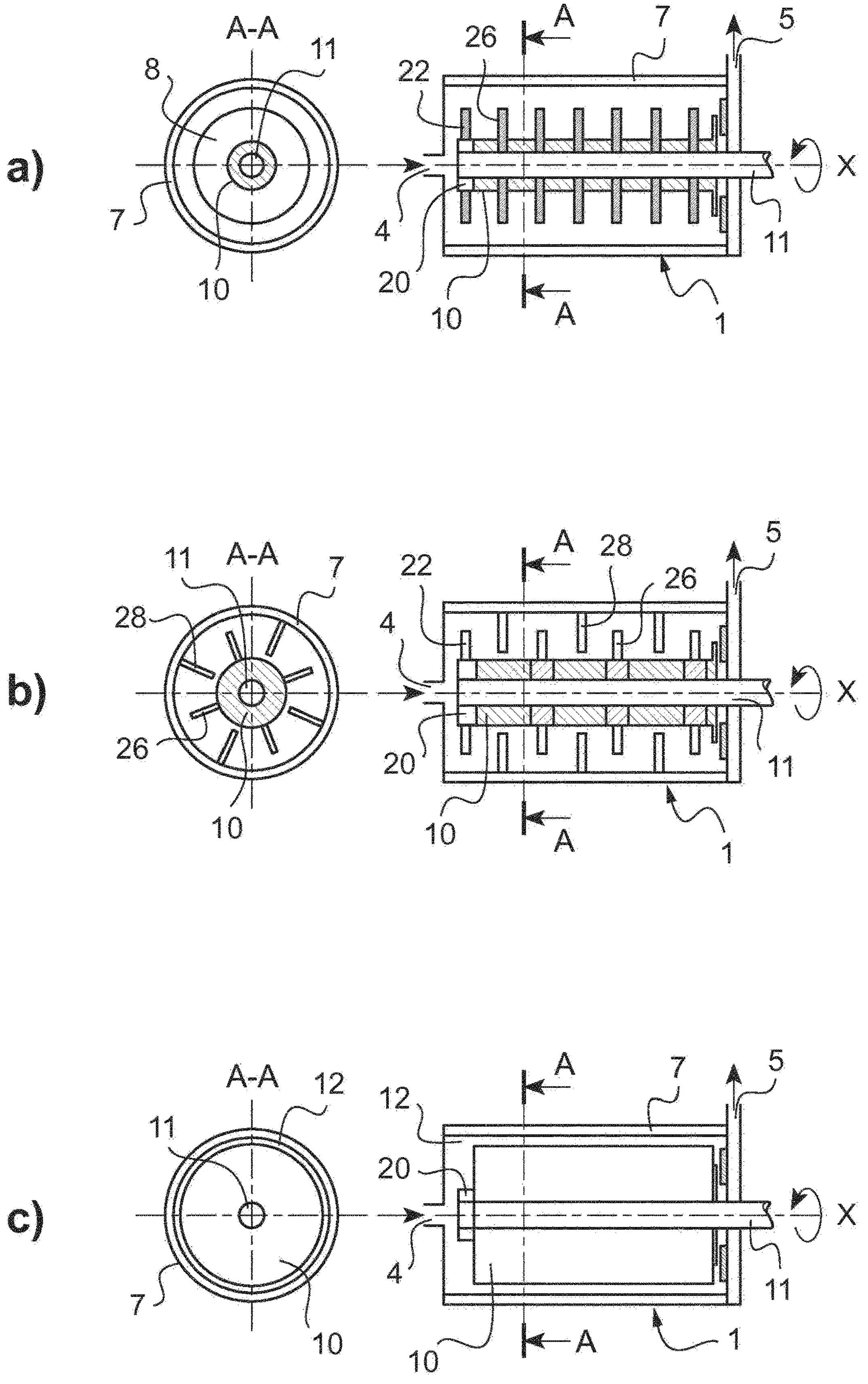
FIG. 3 shows, along sectional planes passing through the longitudinal axis XX and the axis AA, different variants of three-dimensional mills according to the invention each including a heating device and at least one stirrer potentially carrying another mixing member: (a) the stirrer comprises several other mixing members in accordance with the mill of FIG. 1, (b) the stirrer additionally includes fingers capable of cooperating with the other mixing members, and (c) the stirrer comprises no mixing members nor fingers.

In order to improve this stirring, the stirrer 10, just as the inner surface of the inner wall 7 of the chamber 1, can have various possible configurations shown for example in FIG. 3.

According to a first configuration illustrated in FIG. 3*a*, the stirrer 10 comprises, along its elongated rod 11, "rotary" mixing members 22, 26, arranged perpendicular to the latter.

As will be described hereinafter, a mixing member 22 (called "first mixing member") can also correspond to a susceptor of the heating means 20 according to the invention and is hence different from the other mixing members 26 (called "other mixing members"). This first mixing member 22, as well as the other mixing members 26, can correspond to the mixing members described in document U.S. Pat. No. 5,597,126.

In particular, they can include at least two circular disks parallel to each other, configured to set in motion the milling bodies 6 (microbeads).

The number of these mixing members 22, 26 within the milling chamber 1 can vary from 2 to 8, preferably from 2 to 5.

These mixing members 22, 26 make it possible, on the one hand, to improve the milling of the initial suspension by more stirring the microbeads 6 and, on the other hand, to accelerate the reaction time.

According to a second configuration illustrated in FIG. 3*b*, the stirrer 10 can also comprise, along its rod 11, one or several "rotary" mixing members 22, 26, which are further adapted to cooperate with "fixed" fingers 28, arranged perpendicular to the inner wall 7 of the chamber 1.

A finger 28 is in particular in the form of a ring that extends perpendicular from the wall 7.

For this configuration, the mixing members 22, 26 and the fingers 28 are staggered with respect to each other, that is to say that the mixing members 22, 26 and the fingers 28 are arranged in alternating manner in the chamber 1.

The fingers 28 hence form counter-fingers, each arranged between two mixing members 22, 26.

Moreover, the thickness of the rod 11 is increased with respect to the preceding configuration (FIG. 3*a*) so that the periphery of the mixing members 22, 26 is close to the inner wall 7 and that of the fingers 28 is close to the periphery of the rod of the stirrer 10.

Hence, in this configuration, the volume of the chamber is reduced with respect to the preceding configuration, hence allowing a better stirring between the initial suspension, the microbeads 6 and the inner wall 7 of the chamber 1.

According to a third configuration, the volume of the chamber 1 can also be reduced, as illustrated in FIG. 3*c*.

According to this mode, the stirrer 10 has an external diameter slightly lower than the internal diameter of the chamber 1, hence forming an annular chamber 12 of low volume arranged between the outer wall of the stirrer 10 and the inner wall 7 of the chamber 1. The microbeads (not shown) are arranged in this annular chamber 12. During the operation of this third configuration, the starting suspension is introduced through the inlet 4 with a certain flow rate, which will then travel through the annular chamber 12 up to the outlet 5, while being stirred by the microbeads 6.

The geometry of the milling chamber 1 and of the stirrer 10 can be adjusted by the person skilled in the art as a function of the desired reaction, as well as of the desired reaction time. For example, it is also possible that the milling chamber 1 comprises an accelerator in order to improve the milling of the initial mixture. This accelerator being known from the person skilled in the art, it won't be detailed hereinafter.

Generally, the stationary chamber has a diameter from 75 mm to 300 mm for a length from 80 mm to 900 mm and a stirrer 10 having a size from 65 mm to 260 mm. Hence, the volume of the milling chamber can vary from 0.35 L to 600 L, preferably from 0.35 L to 400 L, and typically from 0.35 L to 62 L.

Within the meaning of the invention, "a volume of the stationary chamber 1 from 0.35 L to 600 L" comprises the following values: 0.35; 0.5; 0.8; 1; 2; 3; 4; 5; 6; 7; 8; 9; 10; 15; 20; 25; 30; 35; 40; 45; 50; 55; 60; 65; 70; 80; 85; 90; 100; 110; 120; 130; 140; 150; 160; 170; 180; 190; 200; 210; 220; 230; 240; 250; 260; 270; 280; 290; 300; 350; 400; 450; 500; 550; 600 etc., or all the intervals comprised between these values.

Preferably, the microbeads 6 housed in the milling chamber 3 of the mill 1 during the operation thereof are substantially spherical and have a mean diameter lower than or equal to 5 mm, generally from 0.05 mm to 4 mm, preferably from 0.2 to 3 mm, in particular from 0.3 to 2 mm, and typically of the order of 0.5 to 1 mm. Preferably, the diameter of the microbeads is lower than or equal to 1 mm and is typically of the order of 0.05 mm to 1 mm.

They are preferentially chosen among microbeads having a high hardness and a relatively good resistance to abrasion.

In particular, the microbeads 6 have a Vickers hardness measured according to the standard EN ISO 6507-1 (2005) higher than or equal to 900 HV1, preferably from 900 HV1 to 1600 HV1, typically from 1000 to 1400 HV1, and in particular from 110 to 1300 HV1.

Within the meaning of the invention, "a Vickers hardness higher than or equal to 900 HV1" comprises the following values: 900; 910; 920; 930; 940; 950; 960; 970; 980; 990; 1000; 1010; 1020; 1030; 1040; 1050; 1060; 1070; 1080; 1090; 1000; 1110; 1120; 1130; 1140; 1150; 1160; 1170; 1180; 1190; 1200; 1300; 1400; 1500; 1600; 1700; etc., or all the intervals comprised between these values.

Advantageously, they have a relatively high density. Generally, the microbeads according to the invention have a real density higher than or equal to 2 g/cm$^3$, in particular from 2 to 15 g/cm$^3$, preferably from 3 to 12 g/cm$^3$, and typically from 4 to 10 g/cm$^3$.

Hence, the microbeads according to the invention can be ceramic microbeads (zirconium oxide $ZrO_2$, zirconium silicate $ZrSiO_4$); steel microbeads, tungsten carbide microbeads, glass microbeads or one of their combinations.

Preferably, the microbeads are made of ceramic because they do not generate pollution by their wear.

In particular, the microbeads are made of zirconium oxide.

Potentially, the zirconium oxide microbeads can be stabilized by another oxide, such as cerium oxide, yttrium oxide and/or silicon.

By way of examples, the following compositions, summarized in Table 1 hereinafter, are suitable for forming the microbeads according to the invention:

TABLE 1

| Microbead composition | Hardness HV1 | Real density (g/cm$^3$) | Manufacturer |
|---|---|---|---|
| Zirconium oxide microbeads stabilized by cerium oxide 80% $ZrO_2$ 20% CeO | 1180 | ≥6.10 | Saint-Gobain (Zirmil ®Y Ceramic Beads) ou EIP (Procerox ® ZO Cer) |
| Zirconium oxide microbeads stabilized by yttrium 95% $ZrO_2$ <5% $Al_2O_3$ Rest: $Y_2O_3$ | 1250 | ≥5.95 | EIP (Procerox ® ZO (Y)) |
| Zirconium oxide microbeads stabilized by yttrium and silicon 78% $ZrO_2$, 12% $SiO_2$, 5% $Al_2O_3$ and 4% $Y_2O_3$ | >700 | >4.80 | Saint-Gobain (ER120 Ceramic Beads) |
| Zirconium silicate microbeads $ZrSiO_4$ | ≥800 | >6.5 | Saint-Gobain (Rimax Ceramic Beads) |
| Glass microbeads | 500 | >3.76 | — |
| Steel microbeads | 700 | >7.7 | — |

Generally, the microbeads 6 suitable for the invention are not made of glass or exclusively of glass.

In particular, the microbeads 6 represent, in volume, with respect to the total volume of the stationary chamber 2, from 50% to 85%, preferably from 55% to 70%.

Within the meaning of the invention, "a volume from 50 to 85%" comprises the following values: 50; 55; 60; 65; 70; 75; 80; 85; etc., or all the intervals comprised between these values.

Figure 2:
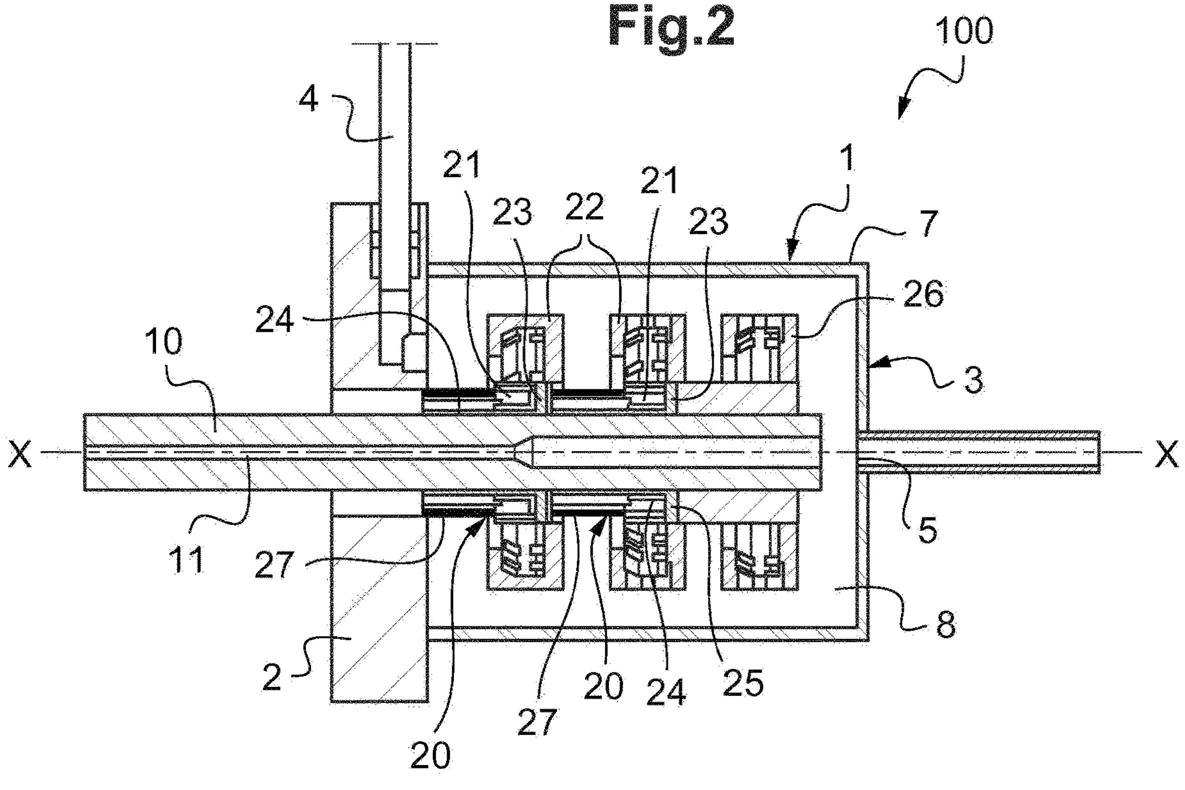
FIG. 2 shows a sectional view along the longitudinal axis XX of a three-dimensional mill according to a second embodiment of the invention, comprising in particular two induction heating devices.

Finally, the mill 100 according to the invention comprises at least one heating device, such as for example an induction heating device 20 that is illustrated in particular in FIGS. 1 and 2.

In particular, the induction heating device(s) 20 are integrated inside the stationary milling chamber 1 and allow heating at least one zone of said stationary milling chamber 1. According to a feature of the invention, the induction heating device(s) 20 are implanted at the inlet of the chamber 1, i.e. in the vicinity of the first end 2 so as to be able to heat the initial mixture flow from the introduction thereof and/or to hence activate the chemical synthesis.

According to a preferred embodiment of the invention, the induction heating device 20 is carried by at least one part of said stirrer 10, allowing the setting of the induction heating device 20 in rotation about the longitudinal axis XX.

This feature has for advantage to allow a better heating of the flow forming the initial mixture.

Generally, the induction heating device 20 comprises:

at least one inducer 21, capable of generating a magnetic field, and at least one susceptor 22, electrically conductive, which is coupled to said inducer 21 and is capable of being heated by said inducer 21.

In particular, the inducer 21 is a coil or a solenoid having turns that surround a portion of said rod 11 of the stirrer 10, advantageously an upstream section located of the side of the first end 2, as shown in FIG. 1.

The inducer 21 is in particular capable of generating a magnetic field, which will allow the heating of conductive materials of its environment, and in particular of the susceptor 22 to which it is coupled. Indeed, the susceptor, which is electrically conductive, is capable of picking-up the magnetic field emitted by the inducer.

Preferably, the inducer 21 is made of multistrand Litz wire and is hence wound on the rod 11 of the mill 100. By way of example, a 300-strand, Cu Litz wire, from ID Partner, 9.425 $mm^2$, 6×50×0.2 mm suits for the invention.

According to a first embodiment schematized in FIG. 3*c*, the three-dimensional mill 100 does not comprise the milling members 22 or 26, the stirring of the initial mixture being performed in the low-volume annular chamber 12.

Hence, the induction heating device 20 is preferentially arranged at the inlet of the chamber 1, at the junction between the rod 11 and the stirrer 10 of greater diameter.

According to this embodiment, the inducer 21, such as a coil, can surround the rod 11; the susceptor 22 can have the form of a disk perpendicular to the rod 11 that surrounds said coil.

The coil and susceptor unit can be set in rotation by the rod 11.

According to a second embodiment as shown in FIGS. 3*a*, 3*b* and, in more detail, in FIGS. 1 and 2, the three-dimensional mill 100 comprises mixing members 22 or 26.

According to this embodiment, the susceptor 22 can correspond to the first mixing member implanted at the first end 2, i.e. to the mixing member the closest to the end 2 of the stationary milling chamber 1.

This first mixing member 22 is hence made of a material that is electrically conductive for forming the susceptor.

By way of example, this first mixing member can be made of a resistive material such as carbon steel in order to have a maximum coupling with respect to the magnetic field emitted by the inducer.

Moreover, the choice of this material is also indicated in that it is preferably creep resistant at high temperature, such as 800° C. By way of example, the first mixing member 22 can be made of stainless steel Phyterm® 260 equivalent to ferric stainless steel Kara from ArcelorMittal, grade K44. This material can be heated up to 700° C., which allows the liquid flow travelling through it to pass from the ambient temperature to the desired temperature.

The other mixing members 26 that are different from the first mixing member 22, i.e. not necessarily electricity conductive, can in particular be made of chromium cast iron or ceramic of the zirconium oxide type.

Referring to FIG. 1, this first mixing member 22 generally includes a base integral with the rod 11 of the stirrer 10. Preferably, the inducer 21 is implanted at this base.

Generally, the induction heating device 20 is connected to an alternating current generator arranged out of said milling chamber 1 through at least one power supply means 27 that is coaxial to the rod 11 of the stirrer 10.

In particular, the generator can have a power from 5 to 15 kW, and preferably of 10 kW, with a frequency varying for example from 17 to 200 kHz. It includes a capacity box that may be in parallel or in series. By way of example, a series generator ID Partner, reference IX3600, model P08010, suits for making the mill according to the invention.

The current supply means 27 can for example correspond to copper strands, preferably a forward current supply strand going to the coil and a return current supply strand going to the generator. These strands can be connected to the generator through a switch 29. This supply means can modify the centre of gravity of the rod 11 of the stirrer 10.

It can however be balanced by being compensated by the insertion of screws, for example made of tungsten.

Generally, the switch 29 is also coaxial to the rod 11 of the stirrer 10. This arrangement has for advantage to power supply the coil when the stirrer 10 is in rotation. Hence, the generator provides a sinusoidal alternating current whose frequency is defined by the oscillation of the system consisted by the unit: generator capacity box, inducer 21 and current supply means 27. The current of the generator is then supplied to the inducer 21 by the switch 29 connected to the latter via the current supply means 27. The inducer 21, supplied with current, will then be able to generate a magnetic field that will be picked-up by the first mixing member 22 and allow the heating thereof. This first mixing member 22, which is set in rotation by the rod 11 of the stirrer 10, will then be able to efficiently heat by thermal conduction the initial mixing (flow) passing through the milling chamber 1.

Generally, the stationary milling chamber 1 integrates a magnetic screen 23 arranged between said inducer 21 and said rod 11 of the stirrer 10, so as to direct the heating towards the initial mixture.

Indeed, it may be that the stirrer 10 or the rod 11 thereof is made of an electrically conductive material, and hence, in order to avoid any overheating of the stirrer 10, it is preferable to protect the stirrer 10 or at least the portion of the rod 11 that is surrounded by the inducer 21.

In particular, the magnetic screen 23 (having a L-shaped cross-section) has a first tubular portion 24 that is sleeved onto at least a portion of length of said rod 11 of the stirrer 1, generally the rod portion that is surrounded by the coil 21, and a second disc-shaped portion 25 or crown-shaped portion, connected to the first portion 24, which is arranged perpendicular to said rod 11.

This magnetic screen 23 has also for advantage to direct the magnetic field emitted by the coil 21 to the first mixing member 22 so that all the power is concentrated outside the inducer and in particular is not directed towards the rod 11. Hence, the heating zone is limited to the outer periphery of the rod 11 and particularly concentrated to the first mixing member 22.

By way of example, the magnetic screen can be a cylindrical torus made of Fluxtrol®.

As just described with reference to FIG. 1, the mill 100 can comprise an induction heating device 20.

However, as a variant, it is possible that the mill 100 comprises, as shown in FIG. 2, two induction heating devices 20.

As shown in this FIG. 2, the two heating devices 20 are generally assembled in series, that is to say that a first heating device identical to the heating device described hereinabove is connected to a second heating device.

The second heating device is also similar to the first heating device, except that it is connected to the same generator and to the same switch as the first heating device.

In particular, the current supply means of the second heating device is arranged between the first mixing member and the second mixing member, this second mixing member acting as a susceptor of the second heating means 20. The latter is arranged perpendicular to the rod 11 and includes a base integral with the latter. The coil of the second heating means also surrounds the rod 11 at this base. The second heating device also comprises a magnetic screen including two portions: a first tubular portion that is sleeved onto a portion of the rod 11 going from the disc 25 of the magnetic screen of the first heating device to the coil of the second heating device including the section surrounded by the coil, and a second portion, also disc-shaped, connected to the first portion and arranged perpendicular to the rod.

This second portion makes it possible in particular to direct the magnetic field emitted by the coil towards the second mixing member.

Moreover, as a function of the size of the mill and of the desired chemical synthesis reaction, it is possible that the mill 100 comprise more induction heating devices 20. However, generally, one or two induction heating devices 20 are sufficient to make the desired synthesis reactions.

In particular, the stationary milling chamber 1 can include a pressure-control means, such as at least one valve (not shown). It is hence possible to work in a controlled atmosphere.

Moreover, the mill 100 can comprise at least one temperature-control means, such as one or several thermocouple (s) arranged at the surface of the milling chamber 1. For example, they can be integrated at the inlet as well as at the outlet of the milling chamber.

Generally, the mill also comprises a means 30 for cooling the final product, such as a heat exchanger, arranged outside said stationary milling chamber 1 on the side of the second end 3.

This cooling means 30 has for advantage to lower the temperature of the final product so as to avoid a potential thermal runaway. For that purpose, the cooling means is adapted to lower the temperature of the final product to a temperature able to reach the ambient temperature (i.e. 15 and 30° C.) or at least to a temperature making it possible to end the desired synthesis reaction.

The present invention also relates to an operating method of the three-dimensional mill 100 as described hereinabove, in particular a three-dimensional mill 100 comprising at least:

- a stationary milling chamber (1) having a wall of generally cylindrical shape extending along a longitudinal axis XX and delimiting an inner space, said chamber being capable of receiving and mixing at least one starting compound, generally at least two, in a liquid medium, so as to form an initial mixture, said stationary milling chamber (1) being intended to be partially filled with at least one milling body (6), preferably microbeads,
- wherein said stationary milling chamber (1) comprises, at a first end (2), at least one inlet (4) for the introduction of said at least one starting compound and said liquid medium and, at a second end (3), an outlet (5) capable of evacuating a final product formed in said stationary milling chamber (1);
- a stirrer (10) arranged in said stationary milling chamber (1), including an elongated rod (11) along the longitudinal axis XX, said stirrer (10) being capable of pivoting so as to set in motion the milling body/initial mixture unit;
- the stationary milling chamber (1) integrating in said inner space at least one heating device (20), that is implanted to heat at least one zone of said stationary milling chamber (1).

Of course, all the features of the mill defined hereinabove are taken up for the description of the operating method.

In particular, the method is characterized in that it comprises the successive following steps:

(i) starting the heating device, preferably an induction heating device 20 and setting the stirrer 10 in rotation;

(ii) introducing said at least one starting compound, generally at least two, into the liquid medium, so as to form an initial mixture, through the inlet 4 of the stationary milling chamber 1;

(iii) milling said initial mixture that is heated by the heating means 20 to a temperature of at least 60° C., preferably from 60 to 800° C., in particular from 60 to 400° C., during a residence time lower than or equal to 30 minutes, preferably lower than or equal to 15 minutes, in particular lower than or equal to 1 minute and notably from 5 to 25 seconds;

(iv) collecting, at the outlet of the stationary milling chamber 1, the final product formed in said chamber.

Preferably, the method comprises the following additional step:

(v) cooling the final product, so that the latter has a temperature lower than or equal to 60° C., preferably lower than or equal to 50° C., and typically lower than or equal to 30° C.

First, the method according to the invention comprises the step (i) comprising in particular the starting of the heating device, such as the induction heating device 20.

For that purpose, the generator is operated in order to emit an alternating current that will be transmitted by the switch and the current supply means to the coil 21. The coil will then emit a variable magnetic field that will be picked-up by the first mixture member 22. This first mixing member 22, which is electrically conductive, will be plunged into this magnetic field thanks, in particular to the magnetic field that, on the one hand, protects the stirrer 10 and, on the other hand, directs the magnetic field towards the latter. This will form at this first mixing member an induced electric current, also called Foucault current. The displacement of the electrons forming this induced current dissipates heat by Joule effect at the first mixing member.

During this step (i), the rod 11 of the stirrer 10 is also set in rotation.

Then, it is proceeded to the step of introducing (ii) the starting compound(s) that may for example have already been previously mixed in order to form an initial mixture with the liquid medium.

Once the initial mixture prepared, the latter is brought to the three-dimensional mill 100, generally through the adjustable-flow rate peristaltic pump via the inlet 4. The peristaltic pump makes it possible to continue the mixing of the initial mixture before the inlet of the chamber 1. Moreover, as indicated above, this pump makes it possible to introduce the starting suspension into the chamber 1 with a controlled passage flow rate.

Generally, the initial mixture is introduced at a passage flow rate higher than or equal to 10 L/h.

Within the meaning of the invention, "a passage flow rate higher than or equal to 10 L/h" comprises the following values: 10 L/h; 15 L/h; 20 L/h; 25 L/h; 30 L/h; 35 L/h; 40

L/h; 45 L/h; 55 L/h; 60 L/h; 65 L/h; 70 L/h; 80 L/h; 85 L/h; 90 L/h; 95 L/h; 100 L/h; 110 L/h; 120 L/h; 130 L/h; 140 L/h; 150 L/h; 50 L/h; 55 L/h; 60 L/h; 65 L/h; 70 L/h; 75 L/h; 80 L/h; 85 L/h; 90 L/h; 95 L/h; 100 L/h; 105 L/h; 110 L/h; 115 L/h; 120 L/h; 125 L/h; 130 L/h; 135 L/h; 140 L/h; 145 L/h; 150 L/h; 155 L/h; 160 L/h; 165 L/h; 170 L/h; 175 L/h; 180 L/h; 200 L/h; 300 L/h; 400 L/h; 500 L/h; 600 L/h; 700 L/h; 800 L/h; 900 L/h; 1 $m^3$/h; 2 $m^3$/h; 3 $m^3$/h; 4 $m^3$/h; 5 $m^3$/h; 6 $m^3$/h; 7 $m^3$/h; 8 $m^3$/h; 9 $m^3$/h; 10 $m^3$/h; 11 $m^3$/h; 12 $m^3$/h; 13 $m^3$/h; 14 $m^3$/h; 15 $m^3$/h; etc., or all the intervals comprised between these values.

In particular, the initial mixture is introduced at a passage flow rate from 10 to 130 L/h, preferably from 20 to 100 L/h, and typically from 30 to 90 L/h.

Of course, the passage flow rates may vary as a function of the size of the three-dimensional microbead mill used to implement the method. For example, for a three-dimensional microbead mill having a stationary chamber 1 of 0.5 L in volume, the passage flow rate will be of the order of 40 to 150 L/h, for example 45 L/h; whereas, for mills of greater size having in particular a stationary chamber 1 of 60 L, the flow rate may be of the order of 2 to 15 $m^3$/h, for example 4 $m^3$/h.

Once the initial mixture introduced into the chamber 1, the milling step (iii) starts.

Under the flow effect created by the passage flow rate, the starting suspension travels through the stationary chamber 1 from the inlet 4 to the outlet 5, while being set in motion by the stirrer 10 which allows an intense stirring of this suspension with the microbeads 6 and, where appropriate, with the mixing members 26, the fingers 28, etc., along the inner wall 7 of the chamber 1.

The induction heating means 20 makes it possible to heat the flow passing through the chamber 1 to a temperature of at least 60° C., preferably from 60 to 800° C., in particular from 60 to 400° C. during a residence time lower than or equal to 30 minutes, preferably lower than or equal to 15 minutes, in particular lower than or equal to 1 minute and, in particular, from 5 to 25 seconds.

According to the invention, "a temperature of at least 60° C." comprises the following values: 60; 61; 62; 63; 64; 65; 66; 67; 68; 69; 70; 71; 72; 73; 75; 75; 80; 81; 82; 83; 84; 85; 86; 87; 88; 89; 90; 100; 110; 120; 130; 140; 150; 160; 170; 180; 190; 200; 210; 250; 300; 350; 400; 450; 500; 550; 600; 650; 700; 750; 800; 850; 900; 950; 1000; 1500; 2000; 2500; 3000; 3500; 4000; 4500; etc. and all the intervals between these values.

Likewise, according to the invention, "a residence time lower than or equal to 30 minutes" comprises the following values: 30 min; 29 min; 28 min; 27 min; 26 min; 25 min; 20 min; 15 min; 14 min; 13 min; 12 min; 11 min; 10 min; 9 min; 8 min; 7 min; 6 min; 5 min; 4 min; 3 min; 2 min; 1 min; 55 sec; 50 sec; 45 sec; 40 sec; 35 sec; 30 sec; 25 sec; 20 sec; 15 sec; 10 sec; 5 sec; etc. or all the intervals between these values.

The residence time is generally inherent to the apparent volume of the microbeads and to the passage flow rate.

For example, if the total apparent volume of the microbeads is of 270 $cm^3$ (beads of apparent density 3.7 g/$cm^3$) and the suspension introduction flow rate is of 45 L/h, i.e. 12.45 $cm^3$/s, then the residence time of the suspension in the chamber 2 is estimated to about 20 seconds. Hence, the residence time may advantageously be adjusted, for example by controlling the apparent density of the microbeads, as well as the passage flow rate.

It is meant by "apparent volume", the volume of the microbeads including the interstitial air between the beads. The apparent density is the ratio between the mass of the microbeads and the apparent volume.

The rotational speed of the stirrer may for example vary from 4 to 20 Pi rad/s, preferably from 4 to 8 Pi rad/s.

The milling step can be performed in continuous or in discontinuous mode in one or several passages (pendular or recirculation mode).

When performed in discontinuous mode, the number of passages of the initial mixture and/or of the final product that is reintroduced into the milling chamber can be from 1 to 50, preferentially from 1 to 10, in particular from 1 to 5 (i.e. after a first passage, the product obtained at the outlet 5 is collected and reinjected again, thanks to the pump, into the chamber 1 via the inlet 4 to allow a second passage).

According to the invention, "a number of passage going from 1 to 50" comprises the following values: 50; 49; 48; 47; 45; 40; 35; 30; 25; 20; 15; 10; 9; 8; 7; 6; 5; 4; 3; 2; 1.

In particular, the number of passages of the starting suspension is of 1 to 2, and preferably of 1.

Indeed, the Applicant has noticed that a single one passage in the microbead mill, despite a very short residence time, would allow obtaining a perfectly satisfying final product at the outlet 5.

Hence, this milling step will preferably be performed in continuous mode.

Once, the milling step performed (iii), the final mixture is collected (iv) at the outlet 5 of the mill 100.

Preferably, at the outlet of the mill 100, the final mixture is cooled thanks to the thermal exchanger. This cooling makes it possible in particular to avoid, where appropriate, a runaway of the chemical reaction performed in the mill.

For that purpose, the cooling means is adapted to lower the temperature of the final product at a temperature liable to reach the ambient temperature (i.e. 15 and 30° C.) or at least at a temperature making it possible to end the desired synthesis reaction.

In particular, as mentioned hereinabove, the cooling of the final product is performed so that the latter has a temperature lower than or equal to 60° C., preferably lower than or equal to 50° C. and typically lower than or equal to 30° C.

Potentially, according to the desired reaction, the final mixture is washed, dried and/or calcined.

The present invention also relates to the use of the three-dimensional mill 100 as described hereinabove to perform organic and mineral chemistry synthesis reactions.

The present invention also relates to the use of the three-dimensional mill 100 as described hereinabove to perform organic and mineral chemistry synthesis reactions or to mill at least one starting compound.

Likewise, all the features of the mill defined hereinabove are taken up herein for the use according to the invention.

EXAMPLE

The description of the tests hereinafter is given by way of purely illustrative and non-limitative example.

A° Characterization: XRD

The X-ray diffractometry (XRD) spectra have been collected with a diffractometer X'Pert Pro MPD marketed by PANalytical B.V., equipped with a primary monochromator Ge(111) (strict radiation CuKα1 (0.15406 nm)).

The detector used is a detector X'Celerator.

The XRD measurements have been made between 5° and 70° (at scale 2θ) with a pitch of 0.017°.

The XRD results have been analysed using the Rietveld1 method, by means of the software X'Pert Highscore Plus (version 4.0).

To make the tests by XRD, the suspensions of zinc glycerolate crystals have been previously dried by air at 50° C., so as to obtain a powder.

B° Mill According to the Invention

Equipment

The tests have been performed in a three-dimensional microbead mill Dynomill ECM AP 2 L from Willy A. Bachofen AG, which contains 1 kg of microbeads, and which has been adapted so as to include a heating device 20 according to the invention, as shown in FIG. 1. That is to say that the mill comprises a heating device positioned at the inlet of the stationary chamber, and the first mixing member acts as a susceptor.

In particular, the heating device has the following features:

TABLE 2

| Elements | Features |
|---|---|
| Generator | Generator of power 10 kW with a rate varying from 17 to 200 kHz/series generator IDPartner, reference IX3600, model PO8010. |
| Inducer | Multistrand Litz wires, resinated to be dismontable. 300-strand, Cu Litz wire, from ID Partner, 9.425 mm$^2$, 6 × 50 × 0.2 mm. |
| Susceptor | Mixing member such as described in U.S. Pat. No. 5,597,126 (FIG. 4) made of stainless steel Phyterm ® 260 equivalent to ferric stainless steel Kara from ArcelorMittal, grade K44. |
| Magnetic screen Current supply means | Cylindrical torus made of Fluxtrol ® The rod 11 has been modified to integrate the coaxial current supply, 3 mm$^2$, made of copper. This coaxial wire modifies the gravity centre of the rod; it is hence balanced by being compensated by the insertion of tungsten screws. |
| Thermocouples | Of K type, at the inlet and the outlet of the milling chamber. |
| Switch | Rotary copper switch |

The microbeads are made of zirconium oxide and have a diameter of 0.45/0.55 mm. The features of the microbeads used for the tests are summarized in Table 3 hereinafter:

TABLE 3

| Microbeads | 0.45/0.55 mm |
|---|---|
| Composition (mass %) | 93% ZrO2<br>5% Y2O3<br>2% other |
| Specific density | 6.0 g/cc |
| Apparent density | 3.7 kg/l |
| Vickers hardness | 1250 HV1 |

The microbeads of 0.45/0.55 mm are in particular marketed under the brand name Zirmil® Y Ceramic Beads by Saint-Gobain.

The milling chamber of the mill has a capacity of 2000 mL and is filled, in volume, with respect to its total volume and as a function of the tests, with 80% of the above-described microbeads.

In operation, the microbeads are stirred by stirrer at a rotational speed of 2890 rpm. The stirrer further includes mixing discs made of chromium cast iron.

Raw Materials

For the tests, the starting raw materials are: zinc oxide (ZnO) of purity 99%, marketed by Ampere Industries, and glycerol of purity 99, 5%, marketed by Reactolab.

C.° General Procedure Implemented for the Tests

Tests According to the Invention

To perform each test hereinafter, the following steps are implemented:

- a starting suspension is prepared in a beaker from zinc oxide and glycerol, according to a mass ratio glycerol-to-zinc oxide of 5.5, and a catalyst (acetic acid or zinc acetate), then the starting suspension is stirred by means of a magnetic stirrer;
- it is then supplied, via an adjustable-flow rate peristaltic pump, to the above-described modified mill Dynomill ECM AP 2 L: the flow rate of passage in the mill may reach several hundreds of L/h. In this test, it has been fixed to 150 L/h, corresponding to a residence time of about 20 s;
- the starting suspension is then passed through the mill including microbeads of diameter 0.45-0.55 mm for a certain duration (which depends on the passage flow rate of the starting suspension) at ambient temperature (20-25° C.), hence allowing, at the outlet of the mill, the obtention of a suspension of zinc glycerolate crystals;
- finally, the suspension of zinc glycerolate crystals is collected.

Comparative Test

A comparative test has also been performed. This test has been implemented using a method for manufacturing zinc glycerolate according to the prior art. This test consists in heating, in a heatable, Z-shaped arm mixer (2 L), zinc hydrozincite (1692 gr) with glycerol (428 gr), a wetting agent Solsperse 21000 (38 gr) and acetic acid as a catalyst (3.6 gr) for 4-5 hours at 120-130° C. (Example 1 of document U.S. Pat. No. 7,074,949).

D° Results

TABLE 4

| | Production of zinc glycerolate | | | | |
|---|---|---|---|---|---|
| Tests | Conventional | Mill of the invention | | | |
| Chemical reactor | Batch | Example 1 | Example 2 | Example 3 | Example 4 |
| Catalyst | Acetic acid | Acetic acid | Acetic acid | Zinc acetate | Zinc acetate |
| Temperature | 120-130° C. | 20° C. | 130° C. | 23° C. | 93° C. |
| Residence time | 4-5 h | 20 sec | 20 sec | 20 sec | 20 sec |
| Molar yield, molar % | 100% | 10% | 38% | 50% | 100% |

Hence, as shown in Examples 2 and 4, and in particular in Example 4 according to the invention, the mill according to the invention makes it possible to perform the desired chemical synthesis reaction with very short residence times.

In Example 2 implemented with the same catalyst as that described in the prior art and with a residence time of 20 seconds against 4-5 hours for the prior art, the yield obtained is of 38% against 10% without the use of a heating device according to the invention. Of course, the yield of 38% could be improved by increasing the residence time of the initial mixture, for example with several passages in the stationary chamber or with a residence time of 1 to 2 minutes, still far lower than the 4-5 hours of the prior art.

Figure 4:
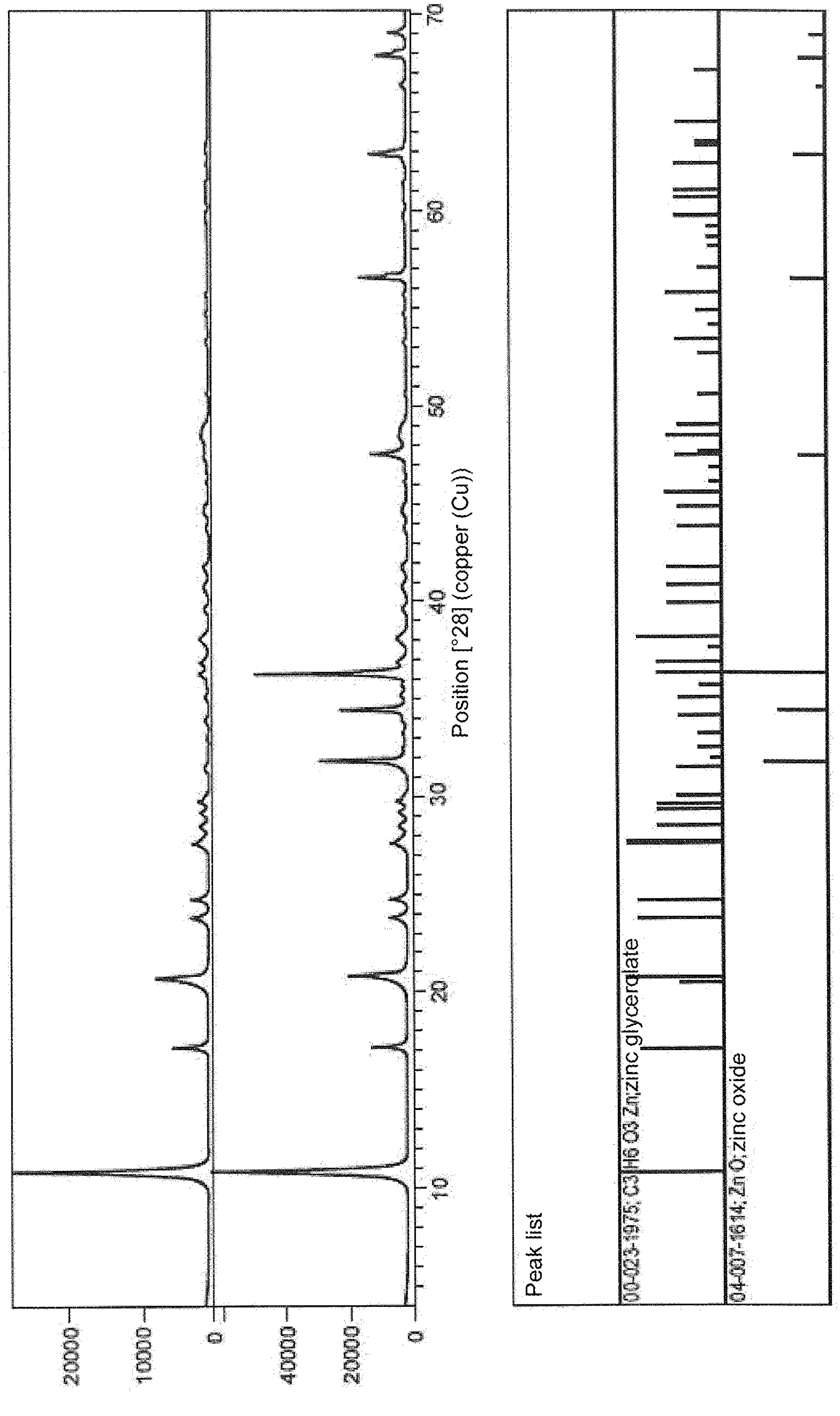
FIG. 4 shows the X-ray diffractometry (DRX) spectra of zinc glycerolate crystals obtained using the mill according to the invention and the operating method associate thereto with zinc acetate as a catalyst when the heating device is used (temperature of 93° C.): Example 4 for the diffractogram located in upper part, or without heating device (temperature of 23° C.); Example 3 for the diffractogram in lower part. Are also shown the identification diffractograms coming from the DRX datasheets ICCD n° 00-023-1975 of zinc glycerolate, and ICCD n° 04-007-1614 of zinc oxide.

In Example 4 implemented with a catalyst different from that described in the prior art and with a residence time of only 20 seconds, a yield of 100% is obtained against the 4-5 hours of the prior art, FIG. 4. Moreover, the yield is of 100% with the heating device against only 50% without the latter: the residual presence of the ZnO reactant is indeed observed on the diffractogram, FIG. 4.

The invention claimed is:

1. A three-dimensional mill comprising:

a stationary milling chamber having a wall of cylindrical shape extending along a longitudinal axis and delimiting an inner space, said stationary milling chamber being configured to receive and mix at least one starting compound in a liquid medium, to form an initial mixture, said stationary milling chamber being configured to be partially filled with at least one milling body, said stationary milling chamber comprising at a first end, at least one inlet configured to introduce said at least one starting compound and said liquid medium, and at a second end, an outlet configured to evacuate a final product formed in said stationary milling chamber; and a stirrer disposed in said stationary milling chamber, the stirrer including an elongated rod along the longitudinal axis, said stirrer being configured to pivot to set in motion the at least one milling body when the at least one milling body is present in the stationary milling chamber and to set in motion the initial mixture, wherein the stationary milling chamber integrates in said inner space at least one heating device that is implanted to heat at least one zone of said stationary milling chamber, the heating device carried by at least one part of the stirrer configured to set the induction heating device in rotation being an induction heating device, the induction heating device comprising:

at least one inducer configured to generate a magnetic field, and at least one electrically conductive susceptor coupled to said inducer and configured to be heated by said inducer.

2. The three-dimensional mill according to claim 1, wherein said stationary milling chamber integrates a magnetic screen disposed between said inducer and said elongated rod of the stirrer to direct the heating towards the initial mixture.

3. The three-dimensional mill according to claim 2, wherein said magnetic screen comprises a first tubular portion that is sleeved onto at least a portion of a length of said elongated rod of the stirrer, and a second disk-shaped portion connected to the first tubular portion, the second disk-shaped portion being disposed perpendicular to said elongated rod.

4. The three-dimensional mill according to claim 1, wherein said at least one inducer is a coil or a solenoid having turns that surround a portion of said rod of the stirrer.

5. The three-dimensional mill according to claim 1, wherein said at least one inducer is a coil or a solenoid having turns that surround a portion of said rod of the stirrer that is an upstream section of said rod located at the first end of the stationary milling chamber, said portion of rod being, where appropriate, protected by said magnetic screen.

6. The three-dimensional mill according to claim 1, wherein said at least one susceptor corresponds to a first mixing member, disposed perpendicular to the stirrer and the elongated rod.

7. The three-dimensional mill according to claim 6, wherein said at least one susceptor is disposed at the first end of the stationary milling chamber.

8. The three-dimensional mill according to claim 6, wherein the first mixing member includes a base made integral with the elongated rod of the stirrer, said inducer being implanted at said base.

9. The three-dimensional mill according to claim 6, wherein the stationary milling chamber comprises, arranged perpendicular to the stirrer, one or a plurality of other mixing members, different from the first mixing member.

10. The three-dimensional mill according to claim 1, wherein said at least one induction heating device is disposed near the first end of the stationary milling chamber.

11. The three-dimensional mill according to claim 1, wherein said at least one induction heating device is connected to an alternating current generator disposed outside said milling chamber, through at least one current supply.

12. The three-dimensional mill according to claim 11, wherein the at least one current supply is coaxial to the rod of the stirrer.

13. The three-dimensional mill according to claim 1, further comprising a cooling system disposed outside said stationary milling chamber and on the side of the second end.

14. An operating method comprising:

providing the three-dimensional mill according to claim 1;

wherein said method further comprises the successive following steps:

(i) starting the heating device and setting the stirrer in rotation;

(ii) introducing said at least one starting compound, in the liquid medium, to form an initial mixture, through the inlet of the stationary milling chamber;

(iii) milling said initial mixture that is heated by the at least one heating device to a temperature of at least ° C., during a residence time lower than or equal to 30 minutes; and (iv) collecting, at the outlet of the stationary milling chamber, the final product formed in said stationary milling chamber.

15. The method according to claim 14, wherein during step (iii), the temperature ranges from 60 to 800° C.

16. The method according to claim 14, wherein during step (iii), the residence time is lower than or equal to 15 minutes.

17. The method according to claim 14, further comprising a following additional step:

(v) cooling the final product, so that the final product has a temperature lower than or equal to 60° C.

* * * * *